Figure 1:
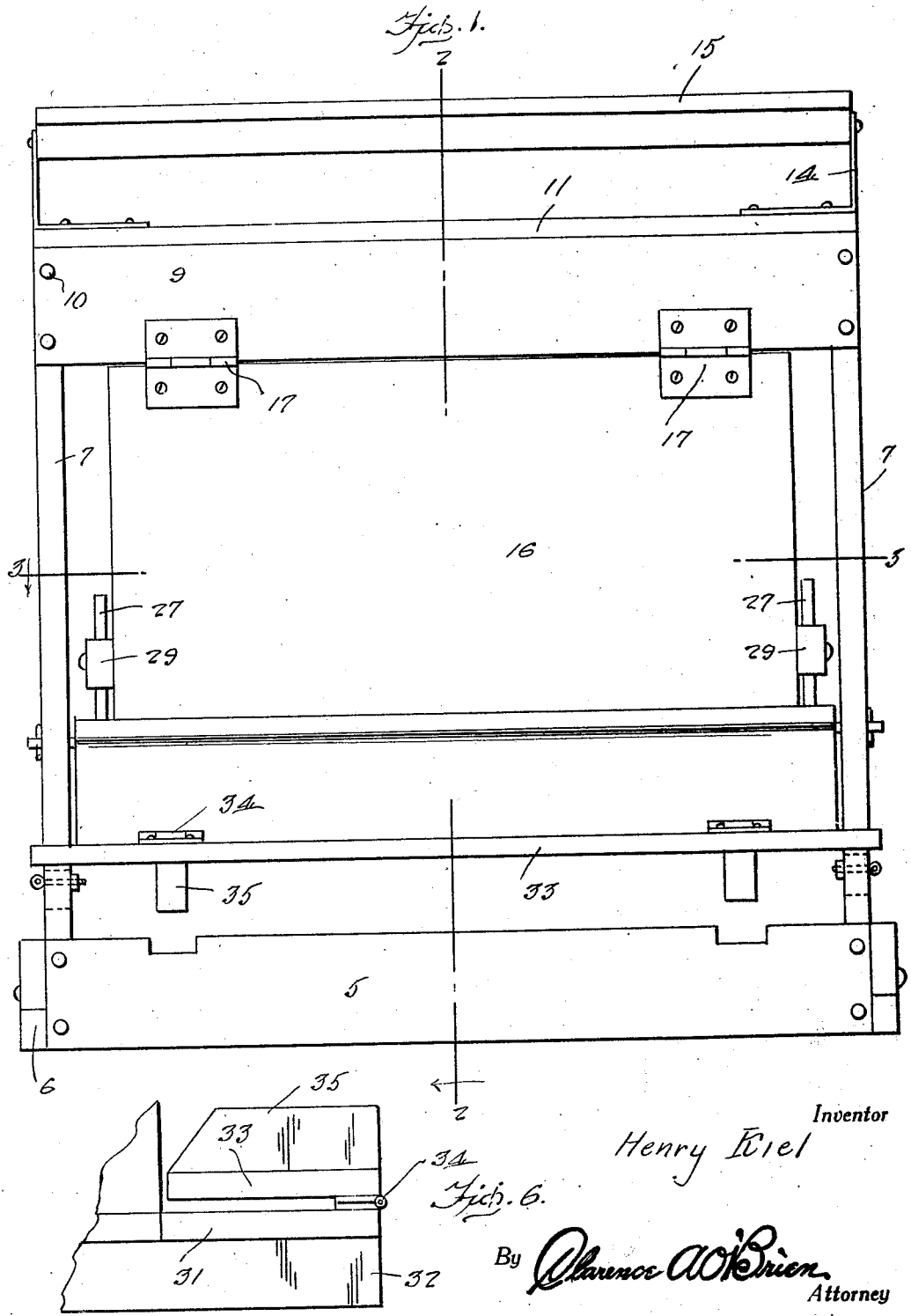

Jan. 13, 1931.  H. KIEL  1,788,677
FEEDER
Filed Feb. 14, 1930  4 Sheets-Sheet 1

Inventor
Henry Kiel
By Clarence A. O'Brien
Attorney

Jan. 13, 1931.   H. KIEL   1,788,677

FEEDER

Filed Feb. 14, 1930   4 Sheets-Sheet 4

Inventor

Henry Kiel

By Clarence A. O'Brien
Attorney

Patented Jan. 13, 1931

1,788,677

UNITED STATES PATENT OFFICE

HENRY KIEL, OF LOST NATION, IOWA

FEEDER

Application filed February 14, 1930. Serial No. 428,400.

The present invention relates to a feeder particularly designed for feeding poultry, and the prime object of the invention resides in the provision of a trough in combination with a hopper adapted to contain mash or the like to supply said mash or the like to the trough.

Another very important object of the invention resides in the provision of a hopper formed in sections movable in respect to one another so as to break up the mash therein so that said mash will be properly fed to the trough in damp weather and the like, when the mash would have a tendency to cake in the hopper.

A still further very important object of the invention resides in the provision of a feeder of this nature which is exceedingly simple in its construction, inexpensive to manufacture, strong, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
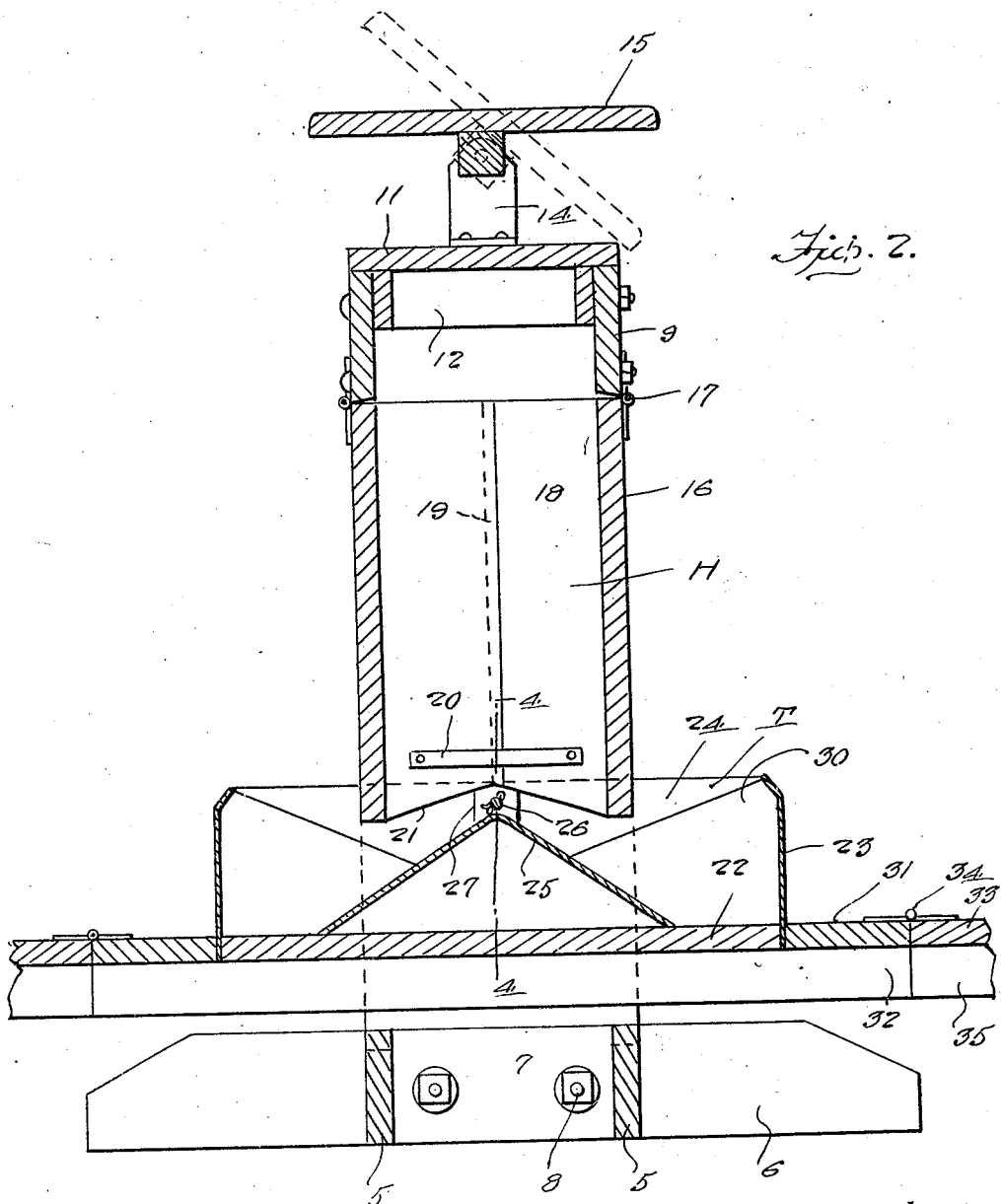
Figure 3:
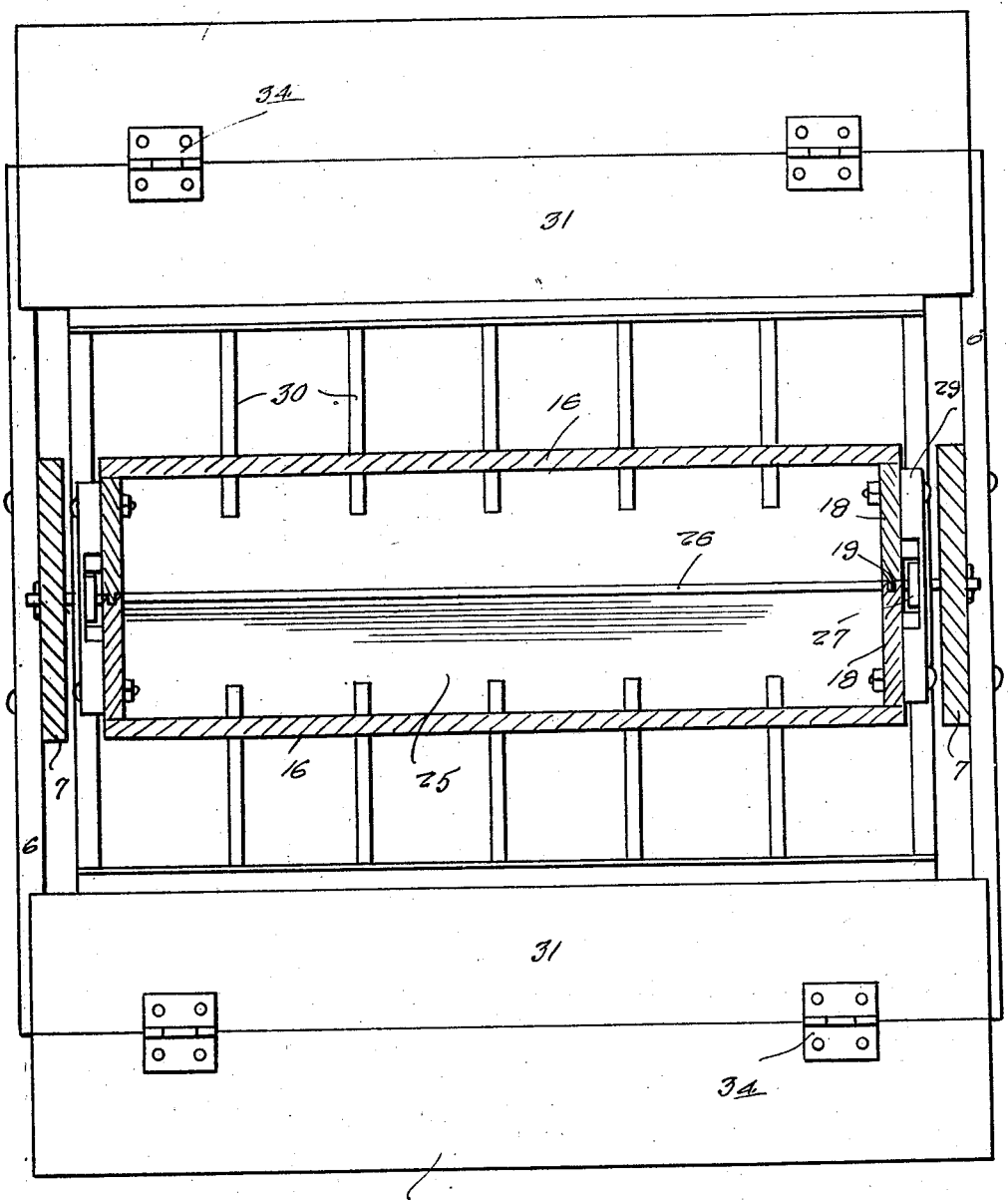
Figure 4:
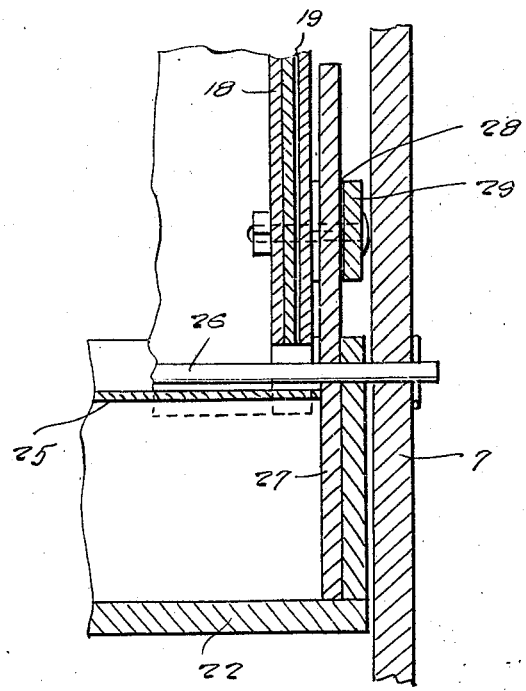
Figure 5:
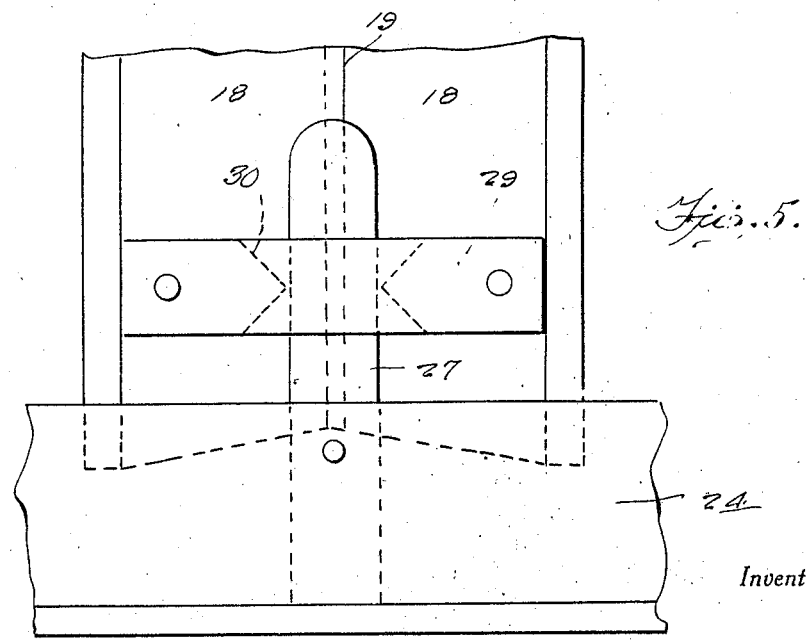

In the drawing:

Figure 1 is a side elevation of the feeder embodying the features of my invention, Figure 2 is a vertical transverse section therethrough taken substantially on the line 2—2 of Figure 1, Figure 3 is a horizontal section taken substantially on the line 3—3 of Figure 1, Figure 4 is an enlarged detail section taken substantially on the line 4—4 of Figure 2, Figure 5 is a fragmentary end elevation of the feeder, and Figure 6 is a detail fragmentary view showing a platform extension folded over on the platform.

Referring to the drawing in detail it will be seen that the base structure comprises longitudinal members 5 in spaced parallelism and connected to cross members 6. Standards 7 rise from the central portions of the cross member 6 being bolted thereto as at 8. Boards 9 extend between the upper ends of the standards 7 being secured thereto by suitable means 10. A cover 11 has a depending rectangular flange 12 fixed thereto so that when the cover rests on the upper edges of the standards 7 and the boards 9 the rectangular frame 12 extends down therebetween.

Brackets 14 rise from the cover 11 and have mounted thereon a tiltable platform 15 so that should any chickens light thereon the platform would tilt and scare the chickens off. This will prevent the chickens from roosting on the feeder. Letter H denotes generally a hopper comprising side walls 16 hingedly connected as at 17 with the boards 9 to depend downwardly therefrom.

End panels 18 are fixed to the walls 16 and have their inner edges connected together by a tongue and groove slidable connection 19. A link brace 20 is pivotally connected at its ends with each side pair of the panels 18 adjacent their lower ends and the lower edges of these panels are inclined upwardly and inwardly as is indicated at 21.

A trough is indicated generally by the letter T and comprises a bottom 22 with sides 23 rising therefrom spaced farther from each other than the walls 16 and ends 24 rising therefrom spaced farther from each other than the two pair of end panels 18.

A distributor 25 is mounted on the bottom 22 and inclines upwardly toward its center so that its apex is immediately under a shaft 26 which extends through the ends 24 of the trough T for rockably supporting said trough. This shaft 26 has its ends projecting through openings in the standard 7. Bars 27 rise from the central end portions of the trough T extending upwardly along the end panels 18 and projecting through an opening 28 in a bar 29.

There is one of these bars 29 on each end of the hopper 8. The openings 28 have their side walls V-shaped as is indicated at 30 in Figure 5. The outer side portions of the trough are divided into compartments by partitions 30. Platforms 31 are mounted to the outer side of the trough T on ribs 32 depending under and fixed to the bottom 20 and platform extensions 33 are hingedly connected with the platforms 31 as at 34 and have ribs or cleats 35 extending thereunder to abut the ends of the ribs 32 so that the extensions 33 may be disposed in coplanar relationship to the platform 31 as is shown in Figure 2 or may be folded upon the platform as indicated in Figure 6.

By removing the cover 11 the hopper H may be filled with mash or other feed and the feed will gravitate downwardly and be spread by the distributor 25 to fill the compartment of the trough T. The chickens light on the platform 31 and feed from the various compartments.

When the chickens light on one of the platforms 31 this causes the tilting of the trough T and as the trough tilts this causes the bars 27 to rock in the hopper because of their disposition through the opening in the block 29. The hopper rocks on the hinges 17 causing the side panels to slide in respect to each other. Thus this will tend to break up the mash in the hopper should it become clogged or caked therein likely to happen in damp weather.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, in the sizes, in the materials, in the combination and arrangement of parts may be resorted to without departing from the spirit of the invention as hereinafter claimed or sacrificing any of its advantages.

Having thus described my invention, what I claim as new is:

1. An apparatus of the class described comprising a hopper, a feeding trough under the hopper, means for rockably mounting the feeding trough, means for rockably mounting the hopper, and means operatively connecting the hopper to the trough so that upon rocking of the trough the hopper will be rocked to agitate the feed therein and permit it to gravitate in the trough.

2. An apparatus of the class described comprising a hopper, a feeding trough under the hopper, means for rockably mounting the feeding trough, means for rockably mounting the hopper, and means operatively connecting the hopper to the trough so that upon rocking of the trough the hopper will be rocked to agitate the feed therein and permit it to gravitate in the trough, distributing means in the center of the trough to distribute the feed to the sides thereof.

3. An apparatus of the class described comprising a hopper, a feeding trough under the hopper, means for rockably mounting the feeding trough, means for rockably mounting the hopper, and means operatively connecting the hopper to the trough so that upon rocking of the trough the hopper will be rocked to agitate the feed therein and permit it to gravitate in the trough, said hopper comprising side walls having end panels projecting inwardly therefrom, tongue and groove connections between the inner edges of the panels to allow the panels to slide in respect to each other as the hopper is rocked.

4. An apparatus of the class described comprising a hopper, a feeding trough under the hopper, means for rockably mounting the feeding trough, means for rockably mounting the hopper, and means operatively connecting the hopper to the trough so that upon rocking of the trough the hopper will be rocked to agitate the feed therein and permit it to gravitate in the trough, said hopper comprising side walls having end panels projecting inwardly therefrom, tongue and groove connections between the inner edges of the panels to allow the panels to slide in respect to each other as the hopper is rocked, means for rockably mounting the hopper comprising a super structure, and hinge connections between the super structure and the side walls.

5. An apparatus of the class described comprising a hopper, a feeding trough under the hopper, means for rockably mounting the feeding trough, and means operatively connecting the hopper to the trough so that upon rocking of the trough the hopper will be rocked to agitate the feed therein and permit it to gravitate in the trough, said hopper comprising side walls having end panels projecting inwardly therefrom, tongue and groove connections between the inner edges of the panels to allow the panels to slide in respect to each other as the hopper is rocked, means for rockably mounting the hopper comprising a super structure, and hinge connections between the super structure and the side walls, a cover for said super structure, brackets rising from the cover, and a platform tiltably mounted between the brackets.

6. An apparatus of the class described comprising a hopper, a feeding trough under the hopper, means for rockably mounting the feeding trough, means for rockably mounting the hopper, and means operatively connecting the hopper to the trough so that upon rocking of the trough the hopper will be rocked to agitate the feed therein and permit it to gravitate in the trough, said hopper comprising side walls having end panels projecting inwardly therefrom, tongue and groove connections between the inner edges of the panels to allow the panels to slide in respect to each other as the hopper is rocked, blocks connected to the lower portions of the outer sides of the panels, said blocks having openings in the central portions thereof, and bars rising from the trough through the openings.

7. In an apparatus of the class described, a hopper formed of movable parts so that the same may be distorted in shape to agitate the contents thereof and prevent clogging, a movable trough under the hopper, and means operatively connecting the movable trough with the hopper so that upon movement of the trough the hopper will be distorted in shape to allow the contents thereof to gravitate freely into the trough.

In testimony whereof I affix my signature.

HENRY KIEL.